United States Patent [19]
Lindley et al.

[11] Patent Number: 4,890,964
[45] Date of Patent: Jan. 2, 1990

[54] SELF-LOCKING FASTENER APPARATUS

[75] Inventors: Adrian Q. Lindley, Grantham, England; Frank J. Cosenza, Santa Barbara, Calif.

[73] Assignee: Rexnord Inc., Torrance, Calif.

[21] Appl. No.: 211,430

[22] Filed: Jun. 24, 1988

[51] Int. Cl.$^4$ .................. F16B 37/08; F16B 39/36
[52] U.S. Cl. .................. 411/270; 411/324; 411/433; 411/935
[58] Field of Search ............ 411/266, 267, 270, 280, 411/324, 433, 937.2, 947, 40, 42, 50, 51, 55, 59, 193, 194, 935

[56] References Cited

U.S. PATENT DOCUMENTS

| | | | |
|---|---|---|---|
| 1,297,725 | 3/1919 | Patton | 411/270 |
| 1,326,598 | 12/1919 | Jaques, Jr. | 411/270 |
| 2,562,376 | 7/1951 | Cragg et al. | |
| 2,605,805 | 8/1952 | Woodling | 411/270 |
| 2,742,938 | 4/1956 | Neuschotz | 411/270 |
| 2,882,948 | 4/1959 | Wallace | 411/935 |

FOREIGN PATENT DOCUMENTS 736008  8/1955  United Kingdom ............. 411/433

Primary Examiner—Neill R. Wilson
Attorney, Agent, or Firm—Pretty, Schroeder, Brueggemann & Clark

[57] ABSTRACT

A threaded fastener apparatus that self-locks onto a threaded bolt only during the very last stage of threading and that provides a predetermined self-locking force that remains substantially constant despite multiple repeated uses. The fastener apparatus includes a nut carried loosely within a locking sleeve that is secured to a workpiece. Threading a bolt into the nut draws the nut's enlarged cylindrical rearward section into compressive engagement with the sleeve's smaller-sized cylindrical forward section, to deform the nut radially inwardly into locking engagement with the bolt. Longitudinal through-slots in the nut's rearward end facilitate the inward deformation.

16 Claims, 3 Drawing Sheets

SELF-LOCKING FASTENER APPARATUS

BACKGROUND OF THE INVENTION

The present invention relates generally to threaded fasteners, and, more particularly, to female threaded fasteners that are self-locking.

Threaded fasteners of this particular kind are useful in a wide variety of applications, where load bearing conditions can vary significantly and where high vibrations can otherwise act to loosen or release fasteners that are not self-locking. Most conventional self-locking fasteners require the application of a substantial torque throughout substantially the entire range of threaded engagement with a bolt. This characteristic presents a number of disadvantages, including increased wear on the fastener threads and on the driving surfaces of the bolt or fastener, increased operator fatigue, and increased assembly time.

One solution to some of the disadvantages of conventional self-locking fasteners is provided by a fastener described in U.S. Pat. No. 2,562,376 to Cragg et al. That fastener includes a radially compressible nut disposed within a shell that compresses the nut onto a bolt as the nut is threadedly tightened in place. The radial compression is effected by a plurality of small protrusions projecting inwardly from the shell into engagement with the nut. During the initial threading of a bolt into the nut, the protrusions project into a circumferential groove formed in the nut's outer surface, whereas during the final threaded turn of the bolt, the groove will have moved axially away from the protrusions so that the protrusions compressively engage the nut's non-grooved outer surface. This radially compresses the nut onto the bolt and thereby locks it in place.

Although the fastener of the Cragg et al. patent is generally effective in locking itself onto a bolt only during the final threaded turn of the bolt, it is not believed to perform entirely satisfactorily. One drawback to the Cragg et al. fastener is that it is generally difficult to precisely control the sizes of the protrusions, which can lead to a variable compressive force. Another drawback is that the protrusions can become worn after repeated use, which can lead to a reduced compressive force.

It should, therefore, be appreciated that there still is a need for a self-locking threaded fastener that does not require application of a substantial torque throughout its entire range of threaded engagement with a bolt and that provides a predetermined, fixed self-locking force even after a significant number of repeated uses. The present invention fulfills this need.

SUMMARY OF THE INVENTION

The present invention is embodied in a self-locking threaded fastener apparatus that requires a substantial fastening torque only during the last stage of fastening and that provides a substantially constant locking force for multiple repeated uses. More particularly, the fastener apparatus of the invention includes a nut having a forward cylindrical end and a coaxial rearward cylindrical end, with a threaded bore extending axially though the two ends, for threadedly receiving a bolt. The rearward end has a diameter greater than that of the forward end, and the rearward end is configured to be deformable radially inwardly in response to a uniform radial compressive force. The fastener apparatus further includes a locking sleeve having an elongated recess for loosely retaining the nut. A forward section of the locking sleeve has an inner diameter intermediate the outer diameters of the forward and rearward sections of the nut, while the rearward section of the locking sleeve has an inner diameter greater than the outer diameters of both the nut's forward and rearward sections. Means are also included for preventing the nut from rotating relative to the locking sleeve, about the nut's longitudinal axis. Rotating of the bolt relative to the nut threadedly advances the nut axially, to bring the nut's rearward section into radially compressive engagement with the locking sleeve's forward section. This radially compresses the nut against the bolt and thereby resists unthreading of the bolt. Because the compressive force is applied to the nut over a cylindrical surface, the nut and sleeve do not wear with repeated use and the compressive self-locking force therefore remains substantially uniform with repeated use.

In a more detailed feature of the invention, the rearward section of the nut is deformable radially inwardly by the inclusion of a plurality, e.g., six, of longitudinally-oriented through-slots extending completely through the nut, from its outer cylindrical surface to the threaded bore. The slots thereby define a plurality of strips that are flexible radially inwardly in response to a uniform compressive force. Similarly, the locking sleeve includes a plurality of longitudinally-oriented through-slots spaced uniformly around its periphery, at least in the region of its forward section. This facilitates a radially outward bowing of this section of the sleeve in response to an outward pressure applied to the sleeve by the nut.

In another aspect of the invention, the confronting surfaces of the nut and sleeve both include intermediate sections, located between their respective forward and rearward sections, having frusto-conical shapes with diameters that vary uniformly between the diameters of the forward and rearward sections on their opposite sides. These frusto-conical sections facilitate the advancement of the nut's rearward section into engagement with the locking sleeve's forward section.

Other features and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
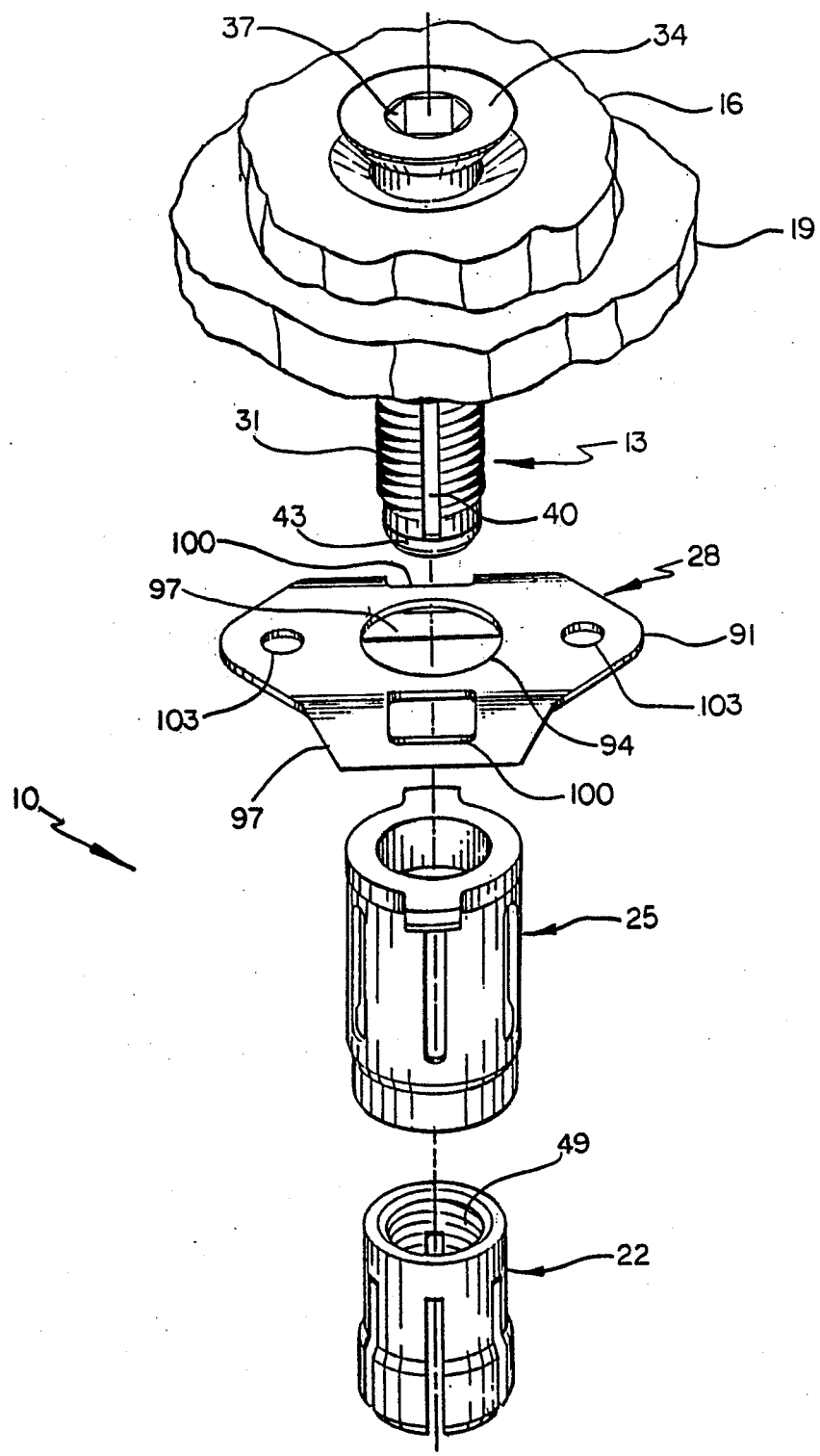
FIG. 1 is an exploded perspective view of a self-locking fastener apparatus in accordance with the invention, shown in axial alignment with a bolt and two workpieces.

With reference now to the drawings, and particularly FIG. 1, there is shown a self-locking fastener apparatus 10 for threaded engagement with a threaded bolt 13 disposed through aligned holes formed in two workpieces 16 and 19. The fastener apparatus includes a nut 22, a locking sleeve 25 that encircles the nut, and a retaining bracket 28 that retains the locking sleeve adjacent to the second workpiece 19. The fastener apparatus is particularly suited for use on the blind side of the workpieces, in a position inaccessible to an operator. In use, threading of the bolt into the nut advances the nut axially within the sleeve, to bring the nut and sleeve into radially-compressive engagement with each other. This deforms the nut radially inwardly, to lock the bolt within the fastener apparatus.

Figure 6A:
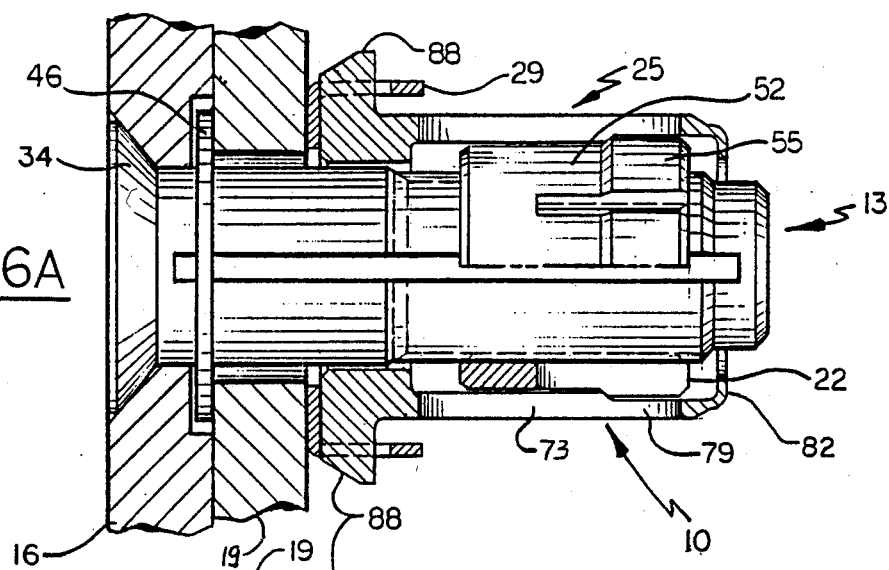
FIGS. 6A–6C are sectional side views of the fastener apparatus of FIG. 1, showing successive positions of the nut and locking sleeve as a bolt is threaded into the nut and subsequently unthreaded from the nut.
Figure 6B:
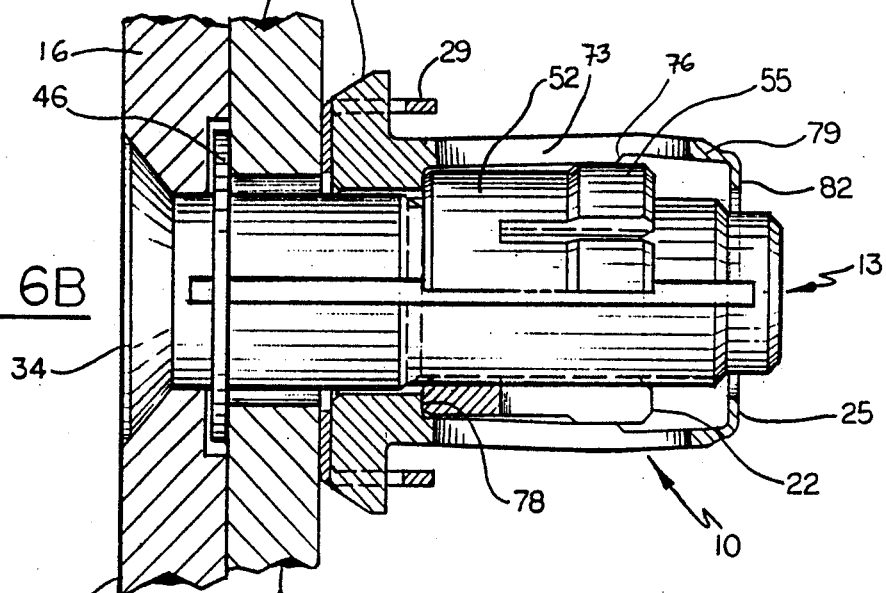
Figure 6C:
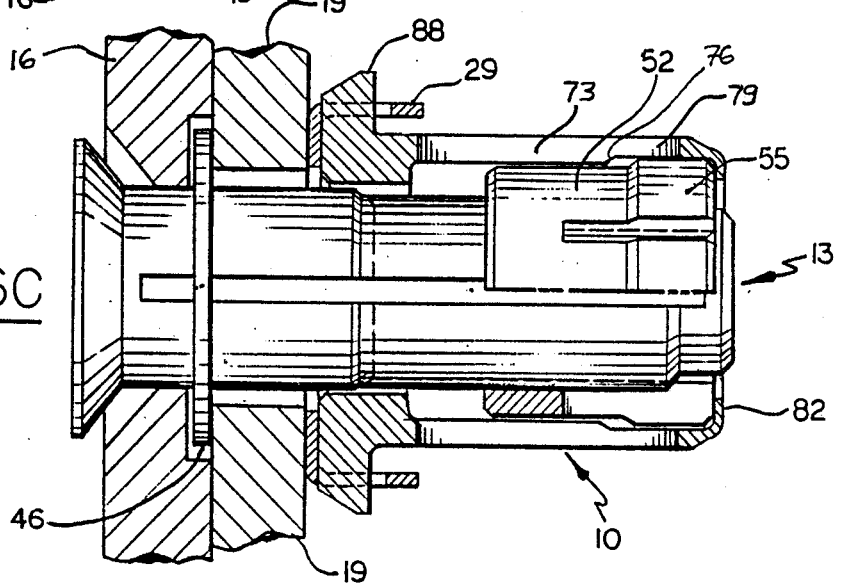

The bolt 13 can be of any conventional design and typically includes a threaded shaft 31 and a head 34 having a driving recess 37. The shaft can include a longitudinal groove 40 and an end cap 43 located at the end opposite the head 34. The groove retains a washer 46 (FIGS. 6A-C).

Figure 2:
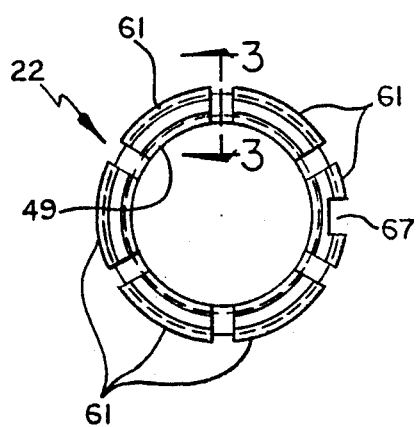
FIG. 2 is an end view of the nut portion of the fastener apparatus illustrated in FIG. 1.
Figure 3:
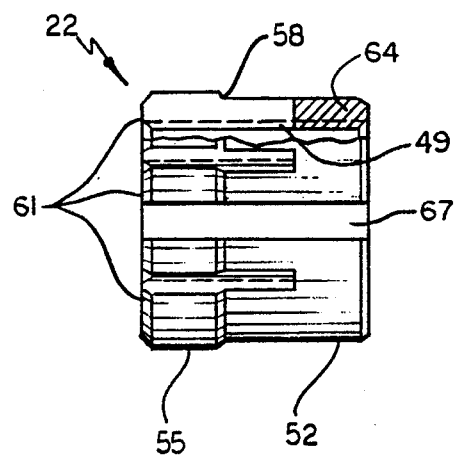
FIG. 3 is a sectional view of the nut, taken in the direction of the arrows 3—3 in FIG. 2.

As best illustrated in FIGS. 2 and 3, the nut 22 has a threaded bore 49 with a thread pattern conforming with the thread pattern of the bolt 13. The nut includes a cylindrical forward section 52, which is disposed closest to the workpieces 16 and 19, and a cylindrical rearward section 55. The forward section has a diameter slightly smaller than that of the rearward section. A middle section 58 of the nut, located between the nut's forward and rearward sections, has a frusto-conical shape, with a diameter that varies uniformly between the diameters of the forward and rearward sections.

The nut 22 also includes six slots 60 oriented generally parallel with the longitudinal axis of the nut's threaded bore 49 and spaced uniformly around the nut's periphery. The slots extend completely through the nut, from its exterior surface to the threaded bore, and they extend along the entire length of the nut's cylindrical rearward section 55 and frusto-conical middle section 58 and project a short distance into the cylindrical forward section 52. A plurality of fingers 61 are thereby defined between the slots, the fingers being deformable radially inwardly in response to a uniform compressive force applied to the nut's rearward section. The fingers are held together by a circular band of solid material 64 that forms the remainder of the nut's forward section. To prevent the nut from rotating relative to the locking sleeve 25, a longitudinally-oriented channel 67 is formed along the entire length of the nut's exterior surface, for conforming engagement with a ridge 70 provided on an internal surface of the sleeve.

Figure 4:
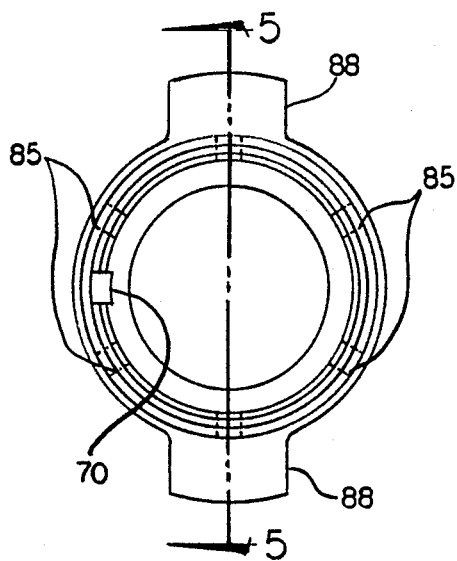
FIG. 4 is an end view of the locking sleeve portion of the fastener apparatus illustrated in FIG. 1.
Figure 5:
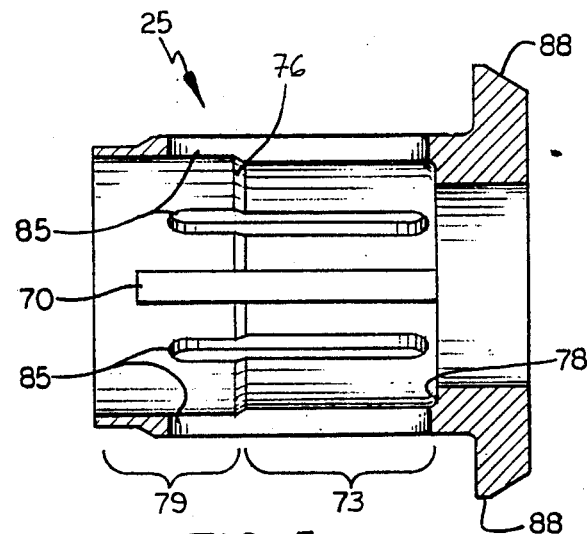
FIG. 5 is a sectional view of the locking sleeve, taken in the direction of the arrows 5—5 in FIG. 4.
Figure 5A:
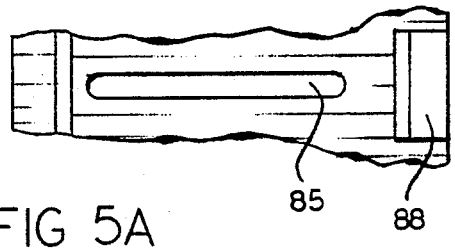
FIG. 5A is a partial side view of the locking sleeve illustrated in FIGS. 4 and 5.

As best illustrated in FIGS. 4 and 5, the locking sleeve 25 includes a longitudinal bore extending completely through it, for loosely receiving the nut 22. The sleeve includes a forward section 73, a middle section 76, and a rearward section 79, each section having a different internal diameter.

The forward section 73 of the locking sleeve 25 is disposed closest to the workpieces 16 and 19, and it has an inner diameter greater than that of the nut's forward section 52, but slightly less than that of the nut's rearward section 55. As discussed more fully below, radial forces are developed between the nut 22 and locking sleeve 25 when the nut threadedly advances on the bolt 13, bringing the nut's rearward section into the locking sleeve's forward section. A ledge 78 is defined at the end of the sleeve's forward section, to provide a proper seating of the nut when the nut has been fully threadedly advanced on the bolt 13.

The rearward section 79 of the locking sleeve 25 is disposed furthest from the workpieces 16 and 19, and it has an inner diameter greater than the diameter of the nut's rearward section 55, so as not to provide any resistance to advancement of the nut 22 on the bolt 13. The middle section 76 of the locking sleeve is located between the sleeve's forward section 73 and rearward section 79. This middle section has a frusto-conical inner surface with a diameter that varies uniformly between that of the forward section and that of the rearward section. The frusto-conical surface preferably makes an angle of about 45 degrees relative to the sleeve's longitudinal axis such that if conforms with the frusto-conical middle section of the nut. This provides a relatively short transition e.g., one revolution of the bolt 13, to move from a situation where no resistance is encountered to a situation where substantial resistance is encountered due to radial compression of the nut onto the bolt.

The rearward section 79 of the locking sleeve 25 further includes an extension 82 that can be deformed radially inwardly to define an annular flange (FIGS. 6A-C) for loosely retaining the nut 22 after the nut has been installed within the sleeve. The locking sleeve also includes six longitudinally-oriented through-slots 85 in its forward section, spaced uniformly around its periphery, to facilitate a radial expansion of the sleeve's forward section when it compressively engages the nut.

Two tabs 88 project outwardly from opposite sides of the locking sleeve's forward section 73, for engagement with the retaining bracket 28 (FIG. 1), to maintain the sleeve in proximity to the workpiece 19. The retaining bracket includes a base 91 having an aperture 94 to accommodate the bolt shaft 31 and projecting portions 97 that define openings 100 to receive and retain the looking sleeve tabs 88. The bracket base also includes apertures 103 to accommodate rivets (not shown) for securing the bracket to the workpiece 19. The retaining bracket is preferably made of a resilient material, such as a thin metal sheet or plastic, so that it can flex to allow the locking sleeve tabs 88 to snap into the openings 100. The bracket openings are preferably slightly larger than the tabs, to allow limited movement of the sleeve relative to the bracket. This relative movement allows the fastener 10 to accommodate slight misalignments in the workpieces 16 and 19 and accompanying displacement of the bolt shaft 31 relative to the fastener.

The assembly and disassembly sequence of the fastener 10 can be appreciated more fully with reference to FIGS. 6A-C. As shown in FIG. 6A, the retaining bracket 28 is first attached to the workpiece 19, and the locking sleeve 25 is snapped into its prescribed position in the bracket. The nut 22 is inserted into the locking sleeve, with the forward section 52 disposed within the sleeve's forward section 73. The extension 82 is then deformed radially inwardly to retain the nut loosely in place. With the nut in this loose position, it is not compressively engaged by the locking sleeve, so the bolt 13 may be easily threaded into the nut with minimal torque.

Rotating the bolt 13 relative to the workpiece 19 threads the bolt into the nut 22, because the locking sleeve 25 is prevented from rotating relative to the workpiece by the retaining bracket, and because the nut is prevented from rotating relative to the locking sleeve by engagement of the locking sleeve ridge 70 with the nut channel 67. As the bolt is threaded into the nut, the nut is drawn axially towards the bolt's head 34. Eventually, the nut's frusto-conical section 58 advances into compressive engagement with the locking sleeve's frusto-conical section 76. At this point, further rotation of the bolt is yieldably resisted by a radially-inward deformation of the nut and a radially-outward deformation of the sleeve.

As shown in FIG. 6B, further threading of the bolt 13 forces the nut's rearward section 55 into the smaller diameter forward section 73 of the locking sleeve. The resulting slight bowing outwardly of the locking sleeve is readily visible in FIG. 6B. The resulting compressive force substantially increases the friction between the nut and the bolt and thereby brings about the fastener's self-locking characteristic. The assembly process is complete when further displacement of the nut is prevented by the nut's forward section 52 seating against the sleeve's ledge 78.

The external surface of the nut's rearward section 55 and the internal surface of the sleeve's forward section 73 are essentially parallel with the bolt's longitudinal axis, whereby the compressive forces acting between the nut 22 and the locking sleeve 25 are oriented essentially radially. Consequently, tensile loading of the bolt is not required to maintain self-locking. In addition, since the radial compression forces are distributed substantially uniformly across a relatively large cylindrical area, undesired wear on the engaging surfaces is minimized and the compression forces remain substantially constant even after multiple repeated uses.

Removal of the bolt 13 from the fastener 10 is initiated by partially unthreading the bolt. During this initial unthreading, the radial compression forces between the nut 22 and the locking sleeve 25 favor displacement of the bolt relative to the workpieces 16 and 19 over displacement of the nut relative to the locking sleeve. The self-locking forces therefore remain present as the bolt is unthreaded. After the bolt has been unthreaded to a point where the head 34 projects a predetermined distance above the workpiece 16, however, the bolt can be tapped lightly toward the workpiece, to displace the nut's rearward section 55 from the sleeve's small-diameter forward section 73 and into the sleeve's large-diameter rearward section 79. This position is depicted in FIG. 6C. In this position, the locking sleeve no longer compresses the nut against the bolt, whereby the bolt can be further extracted with minimal torque.

It should be appreciated from the foregoing description that the present invention provides an improved threaded fastener apparatus that self-locks onto a threaded bolt only during the very last stage of threading and that provides a predetermined self-locking force that remains substantially constant despite repeated use. The fastener apparatus includes a nut carried loosely within a locking sleeve secured to a workpiece, and threading a bolt into the nut draws the nut's enlarged rearward section into compressive engagement with the sleeve's smaller-sized forward section. The resulting radially-inward compressive force on the nut is distributed over a relatively large area, to reduce localized material deformation and facilitate the providing of a substantially constant locking force despite multiple repeated uses.

It will, of course, be understood that modifications to the presently preferred embodiment will be apparent to those skilled in the art. Consequently, the scope of the present invention should not be limited by the particular embodiment discussed above, but should be defined only by the claims set forth below and equivalents thereof.

We claim:

1. A fastener apparatus comprising:
    a nut including a forward cylindrical section and a coaxial rearward cylindrical section, and further including a threaded bore extending axially through the forward and rearward sections, for threadedly receiving a bolt, wherein the rearward section of the nut has an outer diameter greater than the outer diameter of the forward section, and wherein the nut further includes means defining a plurality of longitudinal through-slot spaced uniformly around its periphery, the through-slots all extending along the entire length of the nut's rearward section and projecting partially into the nut's forward section, such that the rearward section of the nut is deformable radially inwardly in response to a uniform radial compressive force;
    a locking sleeve including a forward section with a cylindrical recess having a diameter intermediate the outer diameters of the forward and rearward sections of the nut and further including a rearward section with a cylindrical recess having a diameter greater than the outer diameters of both the forward section and the rearward section of the nut, wherein the cylindrical recesses of the sleeve's forward and rearward sections are axially aligned with each other and are adapted to receive the nut;
    wherein the locking sleeve further includes means defining a plurality of longitudinal through-slots spaced uniformly around its periphery, the through-slots extending along a substantial portion of the sleeve's forward section such that the sleeve's forward section is deformable radially outwardly when the nut is threadedly advanced to a location where the nut's rearward section is compressively engaged by the sleeve's forward section; and
    means for preventing the nut from rotating relative to the locking sleeve, about the axis of the nut's threaded bore;
    wherein rotation of the bolt relative to the nut threadedly moves the nut axially toward the forward section of the locking sleeve, to bring the rearward section of the nut into radially compressive engagement with the forward section of the locking sleeve, to radially compress the nut against the bolt and thereby resist unthreading of the bolt.

2. A fastener apparatus as defined in claim 1, wherein:
    the nut includes six longitudinal through-slots spaced uniformly around its periphery; and
    the locking sleeve includes six longitudinal through-slots spaced uniformly around its periphery.

3. A fastener apparatus as defined in claim 1, wherein:
    the nut further includes an intermediate section located between the nut's forward section and rearward section, the intermediate section having a frusto-conical outer surface; and
    the locking sleeve further includes an intermediate section located between the sleeve's forward section and rearward section, the intermediate section having a frusto-conical recess axially aligned with the recesses of the sleeve's forward and rearward sections.

4. A fastener apparatus as defined in claim 3, wherein:
the frusto-conical outer surface of the nut's intermediate section has an angular orientation of about 45 degrees relative to the nut's axis; and
the frusto-conical recess of the sleeve's intermediate section has a corresponding orientation relative to the sleeve's axis.

5. A fastener apparatus as defined in claim 1, wherein:
the apparatus further includes means for securing the locking sleeve to a workpiece, with the sleeve's longitudinal axis aligned with a hole in the workpiece; and
the locking sleeve further includes an inwardly-projecting annular ledge located between the sleeve's forward section and the workpiece, the ledge being sized for engagement with the nut's forward section, to prevent further threaded advancement of the nut after the nut has threadedly advanced to a predetermined location on the bolt.

6. A fastener apparatus comprising:
a nut having a threaded bore for threadedly receiving a bolt and further having a rearward section with a predetermined uniform dimension transverse to the axis of the threaded bore and further having a frusto-conical edge at one end of the rearward section, the nut further having a forward section located on the opposite side of the frusto-conical edge from the rearward section, the forward section having a longitudinal axis aligned with the threaded bore, and the nut further having means defining a plurality of longitudinal slots spaced uniformly around its periphery and extending from its outer surface to its threaded bore, the slots enabling the rearward section of the nut to deform radially inwardly in response to a uniform radial compressive force;
a locking sleeve having an elongated recess for receiving the nut, the recess having a forward section with a predetermined uniform transverse dimension less than that of the rearward section of the nut but greater than that of the forward section of the nut, a rearward section with a predetermined uniform transverse dimension greater than that of the rearward and forward sections of the nut, and a middle section located between the forward and rearward sections with a frusto-conical shape such that its transverse dimension varies uniformly from that of the forward section to that of the rearward section;
wherein the locking sleeve further includes means defining a plurality of longitudinal through-slots spaced uniformly around its periphery, the through-slots extending along a substantial portion of the sleeve's forward section, such that the sleeve's forward section is deformable radially outwardly when the nut is threadedly advanced to a location where the nut's rearward section is compressively engaged by the sleeve's forward section; and
means for preventing the nut from rotating relative to the locking sleeve, about the axis of the threaded bore;
wherein rotation of the bolt relative to the nut threadedly advances the nut axially toward the forward section of the locking sleeve recess, to bring the nut into radially compressive engagement with the sleeve's forward section and thereby radially compress the nut against the bolt and resist unthreading of the bolt.

7. A fastener apparatus as defined in claim 6, wherein:
the nut includes six longitudinal through-slots spaced uniformly around its periphery; and
the locking sleeve includes six longitudinal through-slots spaced uniformly around its periphery.

8. A fastener apparatus as defined in claim 6, wherein:
the frusto-conical outer surface of the nut's intermediate section has an angular orientation of about 45 degrees relative to the nut's axis; and
the frusto-conical recess of the sleeve's intermediate section has a corresponding orientation relative to the sleeve's axis.

9. A fastener apparatus as defined in claim 6, wherein:
the apparatus further includes means for securing the locking sleeve to a workpiece, with the sleeve's longitudinal axis aligned with a hole in the workpiece; and
the locking sleeve further includes an inwardly-projecting annular ledge located between the sleeve's forward section and the workpiece, the ledge being sized for engagement with the nut, to prevent further threaded advancement of the nut after the nut has threadedly advanced to a predetermined location on the bolt.

10. A fastener apparatus as defined in claim 6, wherein:
the forward and rearward sections of the nut both have outer surfaces that are cylindrical; and
the forward and rearward sections of the locking sleeve recess are both cylindrical.

11. A fastener apparatus for securing a threaded bolt to a workpiece, comprising:
a nut including a forward cylindrical section, a rearward cylindrical section, and an intermediate frusto-conical section, located between the forward and rearward sections, wherein the nut's forward, rearward and intermediate sections have a common longitudinal axis, wherein the transverse diameter of the rearward section is greater than the transverse diameter of the forward section and the transverse diameter of the intermediate section varies uniformly from that of the rearward section to that of the forward section, wherein the nut further includes means defining a threaded bore extending axially through the forward, intermediate and rearward sections, and wherein the nut further includes means defining a plurality of longitudinal through-slots spaced uniformly around the nut and extending along the entire length of the nut's rearward and intermediate sections and projecting partially into the nut's forward section, such that the strips defined between the longitudinal slots are deformable radially inwardly, to constrict the threaded bore, in response to a uniform radial compressive force;
a locking sleeve including a forward section with a cylindrical recess, an intermediate section with a frusto-conical recess, and a rearward section with a cylindrical recess, wherein the recesses of the forward, rearward and intermediate sections have a common longitudinal axis and are sized to receive the nut, wherein the transverse diameter of the forward section recess is less than the transverse diameter of the nut's rearward section, but greater than the transverse diameter of the nut's forward section, wherein the transverse diameter of the rearward section recess is greater than the transverse diameters of the nut's forward and rearward sections, wherein the transverse diameter of the intermediate section recess varies uniformly from that of the forward section recess to that of the rearward section recess, and wherein the locking sleeve further includes means defining a plurality of longitudinal through-slots spaced uniformly around its periphery, adjacent at least the forward section recess, such that the sleeve is deformable radially outwardly in response to a uniform radially-outward pressure applied to the sleeve from the cylindrical recess;

means for securing the locking sleeve to a workpiece, with the locking sleeve's longitudinal axis aligned with a hole in the workpiece; and means for preventing the nut from rotating relative to the locking sleeve, about the nut's longitudinal axis;

wherein rotation of the bolt relative to the nut threadedly moves the nut axially toward the forward section of the locking sleeve, to bring the nut's rearward section into radially compressive engagement with the locking sleeve's forward section, to radially compress the nut against the bolt and thereby resist unthreading of the bolt.

12. A fastener apparatus comprising:

a nut having a threaded bore for threadedly receiving a bolt and further having a rearward section with a predetermined uniform dimension transverse to the axis of the threaded bore and further having a frusto-conical edge at one edge of the rearward section, and the nut further having means defining a plurality of slots spaced substantially uniformly around it periphery and extending from its outer surface to its threaded bore, the slots enabling the nut to deform radially inwardly in response to a uniform radial compressive force;

a locking sleeve having an elongated recess for receiving the nut, the recess having a forward section with a predetermined uniform transverse dimension less than that of the rearward section of the nut, a rearward section with a predetermined uniform transverse dimension greater than that of the nut, and a middle section located between the forward and rearward sections with a frusto-conical shape such that its transverse dimension varies uniformly from that of the forward section to that of the rearward section;

wherein the forward section of the locking sleeve includes means defining a plurality of through-slots extending from is outer surface to its inner surface, such that the forward section is yieldably expandable radially outwardly when the nut is threadedly advanced to a location where the nut's rearward section is compressively engaged by the sleeve's forward section; and means for preventing the nut from rotating relative to the locking sleeve, about the axis of the threaded bore;

wherein rotation of the bolt relative to the nut threadedly advances the nut axially toward the forward section of the locking sleeve recess, to bring the nut's rearward section into radially-compressive engagement with the sleeve's forward section and thereby radially compress the nut against the bolt and resist unthreading of the bolt.

13. A fastener apparatus as defined in claim 12, wherein the nut further includes a forward section located on the opposite side of the frusto-conical edge from the rearward section, the forward section having a longitudinal axis aligned with the threaded bore and further having a uniform transverse dimension less than that of the forward section of the locking sleeve recess.

14. A fastener apparatus as defined in claim 12, wherein:

the nut includes six through-slots oriented longitudinally and spaced uniformly around its periphery; and the locking sleeve includes six through-slots oriented longitudinally and spaced uniformly around its periphery.

15. A fastener apparatus as defined in claim 12, wherein:

the frusto-conical outer surface of the nut's intermediate section has an angular orientation of about 45 degrees relative to the nut's axis; and frusto-conical recess of the sleeve's intermediate section has a corresponding orientation relative to the sleeve's axis.

16. A fastener apparatus as defined in claim 12, wherein:

the apparatus further includes means for securing the locking sleeve to a workpiece, with the sleeve's longitudinal axis aligned with a hole in the workpiece; and the locking sleeve further includes an inwardly-projecting annular ledge located between the sleeve's forward section and the workpiece, the ledge being sized for engagement with the nut, to prevent further threaded advancement of the nut after the nut has threadedly advanced to a predetermined location on the bolt.

* * * * *